United States Patent [19]

Olson

[11] Patent Number: 4,762,038

[45] Date of Patent: Aug. 9, 1988

[54] PIPE MACHINING APPARATUS

[75] Inventor: Peter K. Olson, Buffalo Grove, Ill.

[73] Assignee: The E. H. Wachs Company, Wheeling, Ill.

[21] Appl. No.: 918,293

[22] Filed: Oct. 14, 1986

[51] Int. Cl.[4] .............................................. B23B 3/22
[52] U.S. Cl. ...................................... 82/4 C; 82/4 R; 30/97
[58] Field of Search ............... 82/4 R, 4 C; 30/95–98; 403/344, 322

[56] References Cited

U.S. PATENT DOCUMENTS

| | | | |
|---|---|---|---|
| 3,602,534 | 8/1971 | Dragoo | 403/344 |
| 3,908,491 | 9/1975 | Gilmore | 82/4 C |
| 3,942,248 | 3/1976 | Sherer et al. | 30/97 |
| 4,322,991 | 4/1982 | Feamster, III | 82/4 R |
| 4,397,202 | 8/1983 | Mayfield et al. | 82/4 R |
| 4,483,223 | 11/1984 | Nall et al. | 82/4 C |
| 4,543,861 | 10/1985 | Kwech et al. | 82/4 C |
| 4,677,884 | 7/1987 | Kwech et al. | 82/4 C |

Primary Examiner—Frederick R. Schmidt
Assistant Examiner—Robert Showalter
Attorney, Agent, or Firm—Wood, Dalton, Phillips, Mason & Rowe

[57] ABSTRACT

A pipe machining apparatus having a tool carrier rotatable about a frame mounted externally of a pipe, with the frame being formed of two semiannular sections which are releasbly held together by connection devices including coacting pin and latch structures which are effectively positioned by a member operable from the side of the frame. The tool carrier mounts at least one tool head having a tool slide for a tool movable radially of the pipe. The tool slide is movable by rotation of a feed screw which is rotated in a tool slide advancing direction by a rack and pinion structure including a rack adjustably mounted on a feed plunger which coacts with a tool advance cam on the frame. The rack is also mounted for pivotal movement to permit manual rotation of the feed screw in a tool slide retracting direction, which pivoting results from cogging of the pinion gears relative to the rack gears. The rack is adjustably threaded on the feed plunger to vary the stroke of the rack and adjust the feed rate relative to rotation of the tool carrier without change of the tool-advance cam to one of different contour.

6 Claims, 2 Drawing Sheets

PIPE MACHINING APPARATUS

BACKGROUND OF THE INVENTION

This invention pertains to a pipe machining apparatus and, more particularly, to such apparatus that can be mounted externally of a pipe and which causes one or more tool heads to revolve about the pipe with a tool head having a tool slide which may be advanced toward the pipe to achieve a particular machining operation. An apparatus of this type requires a frame which can be easily and quickly mounted to the pipe and means for advancing the tool slide as the tool head revolves around the pipe. The invention relates to improvements in such structures.

DESCRIPTION OF THE PRIOR ART

The prior art has many examples of pipe machining apparatus which can be mounted in association with a pipe and carry one or more tools for performing machining operations, such as beveling and cut off. One example of such an apparatus is shown in U.S. Pat. No. 4,543,861, wherein a tool head rotatable on a mandrel engageable within a pipe supports a tool for either cut off or beveling operation. The advance of the tool radially of the pipe is derived from intermittent engagement with a tool advance cam carried on a stationary element and which is intermittently engaged by tool-advancing mechanism including linkage which is shifted to intermittently advance a feed screw associated with a tool slide by operation of the linkage transmitting motion through a one-way clutch. The tool-advancing mechanism is relatively complex because of the necessity for the linkage to be of variable length because of the adaptability of the machine for cutting at various angles.

Additional prior art showing intermittently pulsed mechanism for causing tool advance includes the Gilmore U.S. Pat. No. 3,908,491 wherein the pulsing is derived from a stationary tool-advancing cam and Mayfield et al. U.S. Pat. No. 4,397,202 wherein a pawl and ratchet tool-advancing mechanism is pulsed by engagement with a tool-advancing cam.

The known prior art does not disclose a rack and pinion drive for advancing a tool slide in response to intermittent engagement with a tool advance cam, with adjustability of the rack to vary the amount of advancing movement of the tool slide and pivotal mounting of the rack to freely permit manual retraction of the tool slide, nor does the prior art disclose the claimed pin and latch structure for associating semiannular sections of a frame attachable to a pipe for support of the apparatus externally of the pipe.

SUMMARY OF THE INVENTION

A primary feature of the invention is to provide a pipe machining apparatus having new and improved structure for advancing a tool slide relative to a pipe in response to intermittent engagement with a tool advance cam, with ready adjustability of the feed movement of the tool slide, without substitution of a different tool advance cam. Additionally, the structure of the tool advancing mechanism permits retraction of the tool slide without pre-release of engagement between components of the tool-advance mechanism.

Another feature of the invention is to provide new and improved locking structure for interconnecting a pair of semiannular sections which, when joined together, define a frame attachable to the exterior of the pipe and which rotatably mounts a tool carrier which supports one or more tool heads having tool slides for tools that may be used in performing cutting operations on the pipe.

In carrying out the foregoing, the pipe machining apparatus has a frame attachable to the exterior of a pipe and formed by a pair of semiannular sections in abutting relation and held together by novel pin and latch structure operable from the side of the frame, a tool carrier rotatably mounted on the frame, with means on the frame for rotating the tool carrier, one or more tool heads fixed to the tool carrier and having a tool slide for movement radially of the pipe, a movable feed plunger on the tool head and a tool-advance cam on the frame in the path of the feed plunger, and a rack and pinion structure for converting motion of the feed plunger to movement of the tool slide, including a pivotally-mounted rack on the tool head and a pinion operatively connected to a feed screw for the tool slide through a one-way clutch, with the rack being connected to the feed plunger and the rack and feed plunger being mounted for pivotal movement on a pivot block with yieldable means for holding the rack in engagement with the pinion, whereby engagement of the feed plunger with the tool advance cam exerts a force on the rack urging it into engagement with the pinion and also causes linear movement of the rack to rotate the pinion. Reverse rotation of the pinion when retracting the tool slide causes cogging of the pinion relative to the rack, as permitted by the yieldable mounting of the rack.

Additionally, the rack is threaded onto the feed plunger and a feed adjustment nut is also threaded to the feed plunger, which acts to limit the retracting movement of the feed plunger, after disengaging from the tool-advance cam and with the rack being adjustable lengthwise of the feed plunger and held in adjusted position by the feed adjustment nut to control the extent to which the feed plunger can retract and, thus, determine the amount of the advancing stroke thereof when the feed plunger next engages the tool-advance cam.

Further, the aforesaid latch and pin structure includes a pair of recesses in adjacent ends of the semiannular sections of the frame, with one of the recesses having a pin with an exposed part in the recess and the other recess having a movable latch extending outwardly of the recess and normally urged to a retracted position. When the frame sections are brought into abutting relation, the latch enters the recess having the pin and an externally-operable member can be advanced into engagement with the latch to move the latch from retracted position into interlocking relation with the pin.

An object of the invention is to provide a pipe machining apparatus comprising, a tool carrier, means attachable to a pipe for rotatably mounting the tool carrier, means for rotating the tool carrier circumferentially about the pipe, a tool head mounted on the tool carrier and having a tool slide for movement radially of the pipe, a movable feed plunger on said tool head, a tool advance cam on the means attachable to the pipe and in the path of said feed plunger, means for converting motion of the feed plunger to movement of the tool slide including a pivotally-mounted rack and a pinion, said rack being connected to said feed plunger, and yieldable means for holding the rack in engagement with the pinion and permitting rotation of the pinion relative to the rack by forced movement of the rack away from the pinion.

Another object of the invention is to provide a pipe machining apparatus having a rotatable tool carrier mounting a tool head with a movable tool slide, and means attachable to a pipe or the like for movably supporting the tool carrier including two semiannular sections and means for securing said sections together in abutting relation with the improvement therein comprising, a pair of connection devices operable from the side of the sections and having components at the end of each semiannular section, said connection devices each comprising a recess at the adjacent ends of the semiannular section, a pin positioned in one recess with an exposed part, a pivoted latch member positioned in a second recess and extending outwardly therefrom, yieldable means urging the latch member to a retracted position to enable insertion of the latch member into the recess having the pin, and a movable member exposed to the side of the semiannular section and extending into the recess having the pin for engagement with the latch member whereby advance of the movable member pivots the latch member into locking engagement with the exposed part of said pin.

Still another object of the invention is to provide a pipe machining apparatus having a frame attachable to a pipe or the like, a tool carrier rotatably mounted on said frame, at least one tool head fixed to said tool carrier, a tool slide mounted on said tool head for movement radially of the pipe, the improvement in means for advancing the tool slide while enabling manual retraction thereof comprising, a feed screw threaded into the tool slide, a pinion drivingly associated with the feed screw in one direction of rotation through a one-way clutch, a pivot block pivoted on said tool head, a feed plunger reciprocable in said pivot block and having a threaded section, a rack threaded onto the threaded section of the feed plunger and in mesh with said pinion, a tool advance cam on the frame positioned to engage the feed plunger as the tool carrier rotates to cause an advancing stroke of the feed plunger, yieldable means urging the feed plunger to move in a retracting stroke, a feed adjustment nut threaded on the threaded section of the feed plunger in abutting relation with the rack to prevent rotation of the rack on said threaded section and to engage the pivot block and limit the retracting stroke of the feed plunger, and yieldable means to urge the rack into mesh with the pinion, and the pivot mounting of the pivot block to the tool carrier being located whereby a force exerted by the tool advance cam on the feed plunger urges the rack toward the pinion.

DESCRIPTION OF THE PREFERRED EMBODIMENT

Figure 1:
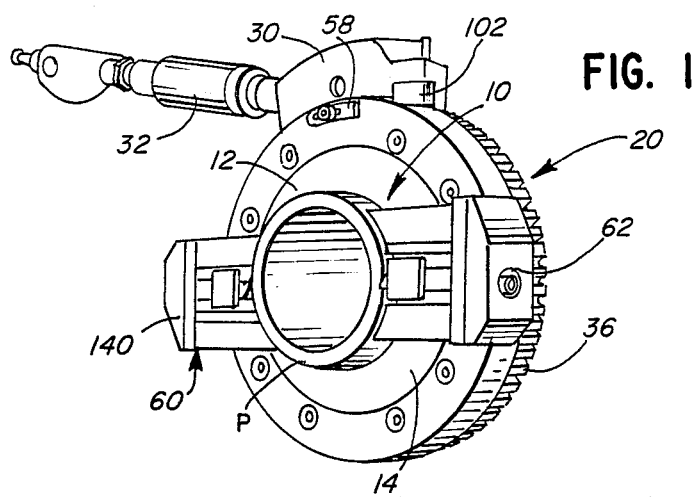
FIG. 1 is a perspective view of the pipe machining apparatus, shown in association with a pipe.
Figure 2:
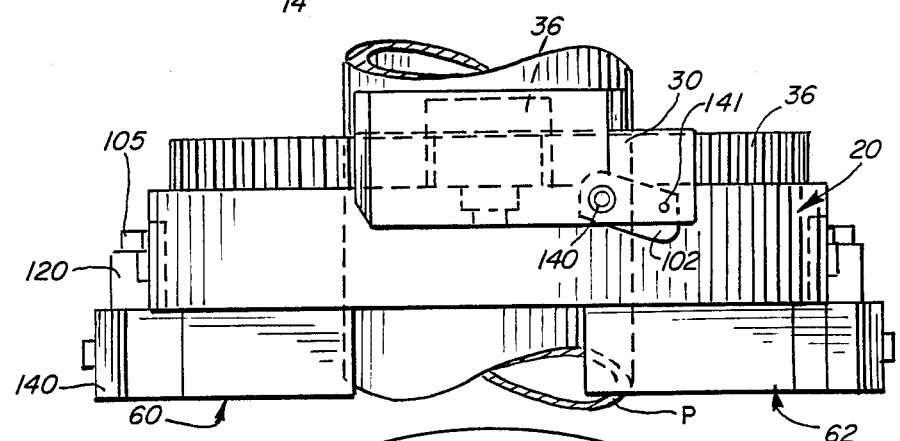
FIG. 2 is a fragmentary plan view of the pipe machining apparatus.
Figure 3:
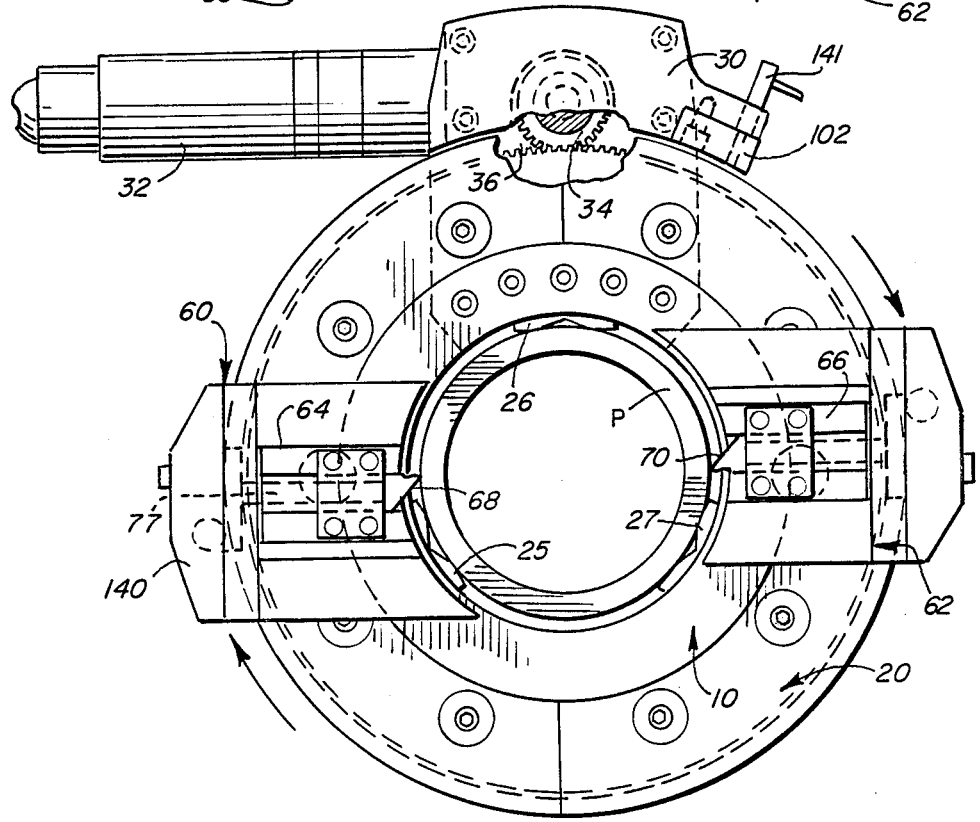
FIG. 3 is a front elevational view of the pipe machining apparatus.

The pipe machining apparatus is shown generally in FIGS. 1, 2 and 3 in association with a pipe P. The pipe machining apparatus has a frame, indicated generally at 10, and formed of two joined-together semiannular sections 12 and 14 and which rotatably mount a tool carrier, indicated generally at 20, composed of two semiannular sections 22 and 24.

The frame 10 carries three radially adjustable members 25, 26 and 27 which can be brought into engagement with the exterior of the pipe P and suitably adjusted in a known manner to locate the frame 10 concentrically with the pipe. This assembly step is performed through access holes in the tool carrier 20.

The tool frame 10 has a column 30 extending outwardly of the frame to have a part thereof radially outward of the tool carrier 20 and which mounts a suitable drive motor 32, such as an air motor with suitable gear reduction means, which drives a gear 34 meshing with a circular gear 36 on the outer periphery of the tool carrier 20. The tool carrier 20 is movably mounted on the tool frame 10 by a dovetail guide structure and by rollers (not shown) mounted on the exterior of the tool frame engaging with grooves on the interior of the tool carriage 20, whereby energization of the motor 32 results in rotation of the tool carrier 20 relative to the frame 10 by the driving engagement between the gears 34 and 36.

Figure 6:
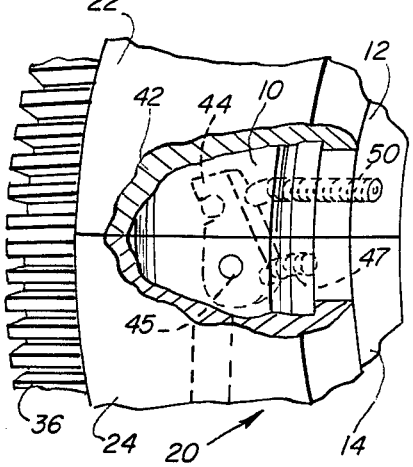
FIG. 6 is a fragmentary perspective view, with parts broken away, showing a connection device for the frame of the apparatus.
Figure 7:
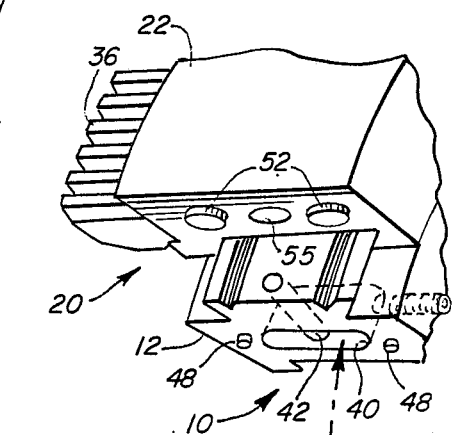
FIG. 7 is an exploded perspective view of the structure shown in FIG. 6.
Figure 7:
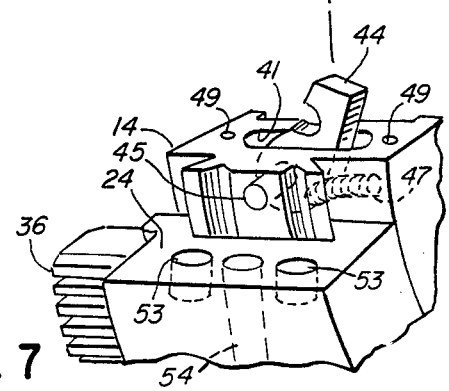

The structure of the tool frame 10 and tool carrier 20 is more particularly shown in FIGS. 6 and 7. Each of the tool frame sections 12 and 14 have components at the ends thereof defining a pair of connection devices. One of the connection devices is seen particularly in FIGS. 6 and 7 and includes a pair of recesses 40 and 41 in the adjacent ends of the sections, with the recess 40 having a pin 42 with a part thereof exposed centrally of the recess 40 and the recess 41 having a latch member 44 extending outwardly therefrom and mounted for pivotal movement on a pivot pin 45. Yieldable means in the form of a spring 47 engages the latch member 44 at a location relative to the pivot pin 45 to urge the latch member 44 to a retracted position, as shown in FIG. 7. When the ends of the frame sections 12 and 14 are brought into abutting relation and into alignment by pins 48 engaging in holes 49, the latch member 44 is pivoted from its retracted position to the position shown in FIG. 6 to interlock with the pin 42. This interlocking relation is achieved by advancing movement of a member carried on the frame section 12 into engagement with the latch member 44 to cause pivoting thereof. This advancing member is shown in the form of an externally-threaded member 50 operable from the side of the frame 10. When the frame is to be disassembled, the threaded member 50 is backed-out and the spring 47 is operable to pivot the latch member 44 to its retracted position out of engagement with the pin 42.

The tool carrier 20 has coacting plugs and holes at opposite ends of the tool carrier sections 22 and 24 to bring the sections into alignment when the tool carrier is assembled, with the section 22 having the plugs 52 and the section 24 having openings 53 to receive the plugs. An externally-operable threaded member can be advanced through an opening 54 in the section 24 into threaded engagement with an opening 55 in the section 22 to hold the carrier sections together. The structure shown in FIGS. 6 and 7 is duplicated at the opposite ends of both the frame sections 12 and 14 and the tool carrier sections 22 and 24. In order to retain the tool carrier sections 22 and 24 in loose pivotal relation, a floating hinge connection is provided at 58 at both the front and rear of the tool carrier.

The tool carrier 20 can mount one or more tool heads, with two tool heads 60 and 62 being shown in FIGS. 1 to 3. These tool heads are suitably attached to the tool carrier, whereby rotation of the tool carrier causes the tool heads to revolve around the pipe P. Each of the tool heads movably mounts a tool slide, with the respective tool slides being shown at 64 and 66 and carrying the respective tools 68 and 70. As an example, one of these tools can be a bevel tool and the other a parting tool for cut-off.

Figure 4:
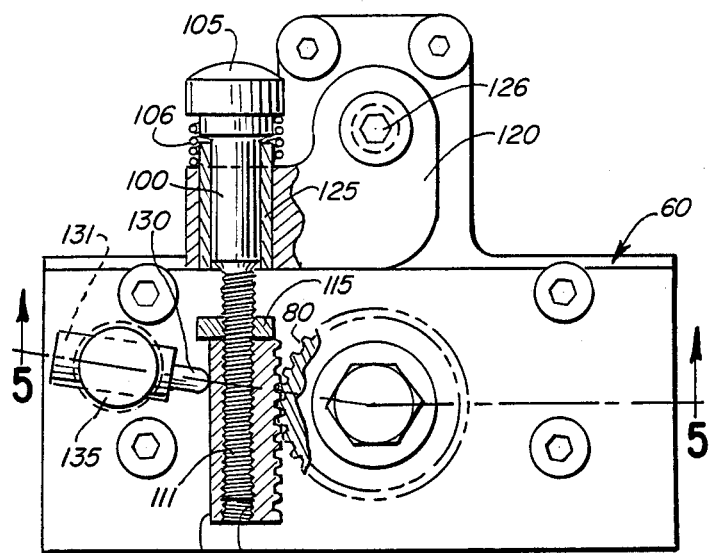
FIG. 4 is a plan view of a tool head, with parts broken away.
Figure 5:
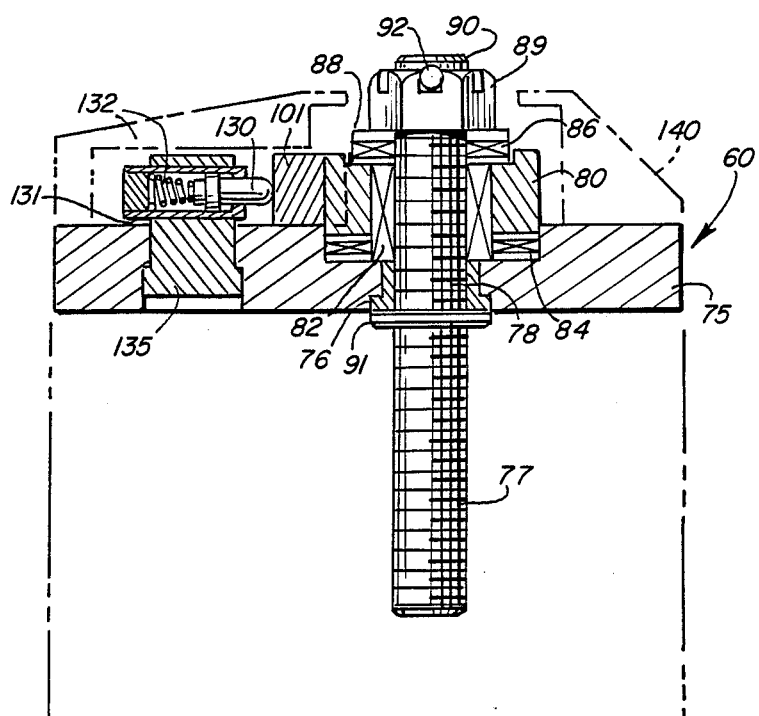
FIG. 5 is a sectional view, taken generally along the line 5—5 in FIG. 4 with the tool slide omitted.

Each of the tool heads may be of the same construction and the tool head 60 is shown in FIGS. 4 and 5. The tool head 60 has a plate 75 formed with a recess which mounts a bushing 76 which rotatably receives a feed screw 77 having a threaded section threadably engaged with the tool slide 64 and a section 78 rotatable in the bushing 76. The section 78 mounts a surrounding pinion 80 which is rotatably associated with the feed screw by a one-way clutch bearing 82. This one-way clutch bearing can be a type DC roller clutch offered by Torrington. The one-way clutch bearing results in rotation of the feed screw when the pinion rotates in one direction, and nonrotation of the feed screw when the pinion rotates in the other direction. The one-way clutch bearing 82 and pinion 80 are held in position between a pair of thrust bearings 84 and 86 by a washer 88 compressively engaged by a nut 89 on a threaded end 90 of the feed screw 77 and with the reaction to the compressive engagement being through a flange 91 on the feed screw. A roll pin 92 engages within a pair of notches at the upper end of the nut 89 and extends through the threaded end 90 of the feed screw to lock the nut to the feed screw for a purpose to be described.

The feed screw 77 is caused to rotate through rotation of the pinion 80 by coaction of a movable feed plunger 100 having a rack 101 meshing with the pinion 80 and which coacts with a tool advance cam 102 on the column 30.

The movable feed plunger 100 has a dome-shaped end 105 for engagement with the tool advance cam 102 as the tool carrier 20 rotates about the pipe in the direction of the arrows shown in FIG. 3. The feed plunger is urged outwardly toward the tool advance cam by a surrounding spring 106, with the feed plunger being shown in extended position in FIG. 4, as caused by engagement with the tool advance cam. This engagement is intermittent and occurs once each time on each revolution of the tool carrier 20 and, as the feed plunger advances from the retracted position to the advance position shown in FIG. 4, the rack 101 causes rotation of the pinion 80 which, through the one-way clutch bearing 82, causes rotation of feed screw 77 and resulting advance of the tool slide 64. The rack 101 has an internally-threaded bore 110 which threadably mounts the rack 101 to a threaded section 111 of the feed plunger. With this construction, it is possible to adjust the rack 101 lengthwise of the feed plunger and control the length of the advancing stroke of the feed plunger. A feed adjustment nut 115 is also threaded onto the threaded section 111 of the feed plunger and is used to hold the rack 101 in adjusted position and also abuts against an end of a pivot block 120 when the feed plunger is in retracted position. With the rack being adjustable lengthwise of the feed plunger and the feed adjustment nut 115 being positioned in abutment with the rack after adjustment, it will be seen that the location of the rack and the feed adjustment nut determines the extent to which the feed plunger can retract and, thus, the extent to which the tool-advance cam 102 will be effective to move the feed plunger in an advancing direction. If the feed plunger cannot retract to a position to engage the full length of the tool-advance cam 102, it engages only a portion of the cam surface and, thus, there is a lesser advancing stroke.

The feed plunger is mounted in the pivot block 120 by means of a bushing 125, with the pivot block being mounted on the tool head 60 by a pivot mounting 126. The pivot block is provided in order to enable simple manual retraction of the tool slide 64.

With the tool carrier 20 rotating clockwise, as viewed in FIG. 3 and as indicated by the arrows in the Figure, it will be seen that the dome-shaped end 105 of the feed plunger engages the tool-advance cam 102 after the pivot mounting 126 has moved past the tool-advance cam whereby the force exerted by the tool-advance cam acts in a direction about the pivot mounting 126 to urge the rack 101 into firm mesh with the pinion 80 as well as to advance the feed plunger and the rack. The one-way clutch bearing 82 transmits this motion to the feed screw. When the tool slide is to be retracted, it is necessary to rotate the feed screw 77 in an opposite direction, and this is done by use of a tool engaging the nut 89 fixed to the threaded end 90 of the feed screw by the roll pin 92. Rotation of the feed screw 77 in a direction to retract the tool slide results in rotation of the pinion 80 through the one-way clutch bearing 82. However, movement of the rack 101 is prevented because of engagement of the feed adjustment nut 115 with the pivot block 120. In order to permit movement of the pinion 80, the pivot block 120 can pivot clockwise and with the tapered shape of the gear teeth on the pinion 80 and the rack 101, the rack is cammed outwardly by the teeth shape as permitted by pivoting of the pivot block 120 and the pinion teeth "cog" along the rack teeth. This action is against yieldable means urging the rack 101 into engagement with the pinion, with this yieldable means including an outwardly urged pin 130 movably mounted within a tube 131 housing a spring 132 and with the tube being adjustably mounted in a member 135 carried by the plate 75. This yieldable means acts to preclude pivoting of the pivot block 120 in a clockwise direction as the feed plunger 100 retracts in normal cutting operation but yields to permit the cogging action when the feed screw 77 is manually rotated in a direction to retract the tool slide. A cover member 140 for the plate 75 is shown in broken line in FIG. 5.

With the adjustable rack and feed adjustment nut structure, it is possible to vary the rate of advance of the tool slide relative to the rate of rotation of the tool carrier without changing the shape of the tool advance cam 102. The tool advance cam is pivotally-mounted on the column 30 by a pivot pin 140 and is urged outwardly by a spring (not shown). A retractable pin 141, carried by the column 30, can be moved inwardly to a position behind the tool-advance cam to hold it in operative position, as seen in FIGS. 1 and 2. When it is desired to have rotation of the tool carrier without advance of a tool slide, the lock pin 141 can be raised to a position clear of the tool-advance cam whereby the tool advance cam is free to retract each time it is contacted by the dome-shaped end 105 of the feed plunger.

I claim:

1. A pipe machining apparatus comprising, a tool carrier, a frame attachable to a pipe for rotatably mounting the tool carrier, means for rotating the tool carrier circumferentially about the pipe, a tool head mounted on the tool carrier and having a tool slide for movement radially of the pipe, a movable feed plunger on said tool head, a tool advance cam on the frame and in the path of said feed plunger, means for converting motion of the feed plunger to movement of the tool slide including a rotatable member operatively connected to said tool slide, a pivotally-mounted rack, a pinion and a one-way clutch operatively connected to said rotatable member, said rack being connected to said feed plunger, and yieldable means for holding the rack in engagement with the pinion and permitting reverse rotation of the pinion relative to the rack by forced pivotal movement of the rack away from the pinion.

2. A pipe machining apparatus as defined in claim 1 where said rotatable member is a feed screw rotatably mounted in said tool head and threadably connected to said tool slide, said pinion being rotatably mounted on the feed screw, and said one-way clutch being interposed between said pinion and feed screw.

3. A pipe machining apparatus as defined in claim 1 including a pivot block pivotally mounted on the tool head, said movable feed plunger being reciprocally movable in said pivot block and having said rack fixed thereto.

4. A pipe machining apparatus as defined in claim 1 wherein said frame has two semiannular sections, and means for securing said sections together in abutting relation comprising, a pair of connection devices operable from the side of the sections and having components at the end of each semiannular section, said connection devices each comprising first and second recesses at the adjacent ends of the semiannular sections, a pin positioned in the first recess with an exposed part, a pivoted latch member positioned in the second recess and extending outwardly therefrom, spring means urging the latch member to a retracted position to enable insertion of the latch member into the first recess having the pin, and a movable member exposed to the side of one of the semiannular sections and extending into the recess having the pin for engagement with the latch member whereby advance of the movable member moves the latch member into locking engagement with the exposed part of said pin.

5. A pipe machining apparatus having a frame attachable to a pipe or the like, a tool carrier rotatably-mounted on said frame, at least one tool head fixed to said tool carrier, a tool slide mounted on said tool head for movement radially of the pipe, the improvement in means for advancing the tool slide while enabling manual retraction thereof comprising, a feed screw threaded into the tool slide, a pinion drivingly associated with the feed screw in one direction of rotation through a one-way clutch, a pivot block pivoted on said tool head, a feed plunger reciprocable in said pivot block and having a threaded section, a rack threaded onto the threaded section of the feed plunger and in mesh with said pinion, a tool advance cam on the frame positioned to engage the feed plunger as the tool carrier rotates to cause an advancing stroke of the feed plunger, yieldable means urging the feed plunger to move in a retracting stroke, a feed adjustment nut threaded on the threaded section of the feed plunger in abutting relation with the rack to prevent rotation of the rack on said threaded section and to engage the pivot block and limit the retracting stroke of the feed plunger, yieldable means to urge the rack into mesh with the pinion, and the pivot mounting of the pivot block to the tool carrier being located whereby a force exerted by the tool advance cam on the feed plunger urges the rack toward the pinion.

6. A pipe machining apparatus comprising, a tool carrier, a frame attachable to a pipe for rotatably mounting the tool carrier, means for rotating the tool carrier circumferentially about the pipe, a tool head mounted on the tool carrier and having a tool slide for movement radially of the pipe, a movable feed plunger on said tool head, a tool advance cam on the frame and in the path of said feed plunger, means for converting motion of the feed plunger to movement of the tool slide including a pivotally-mounted rack and a pinion, said rack being connected to said feed plunger, a pivot block pivotally mounted on the tool head, said movable feed plunger being reciprocally movable in said pivot block and having said rack fixed thereto, said pivot block being prevented from pivoting in one direction by engagement between the rack and pinion when said movable feed plunger engages said tool-advance cam, and yieldable means urging the rack and pinion into engagement whereby the tool slide can be retracted with the pinion free to rotate by cogging along the rack which moves away therefrom against the yieldable means and as enabled by pivoting of said pivot block.

* * * * *